June 14, 1927.

J. T. DALTON ET AL 1,632,177

TOBACCO STRIPPING MACHINE

Filed April 20, 1925  5 Sheets-Sheet 5

INVENTOR
John T. Dalton and
Blake W. Corson.
BY
ATTORNEY

Patented June 14, 1927.

1,632,177

UNITED STATES PATENT OFFICE.

JOHN T. DALTON, OF DURHAM, NORTH CAROLINA, AND BLAKE W. CORSON, OF RICHMOND, VIRGINIA, ASSIGNORS TO THE AMERICAN TOBACCO COMPANY, OF NEW YORK, N. Y., A CORPORATION OF NEW JERSEY.

TOBACCO-STRIPPING MACHINE.

Application filed April 20, 1925. Serial No. 24,586.

This invention is an improvement in tobacco stripping machines, and more particularly in machines for stripping the leaf lamina from the stem in as nearly a single piece as possible.

Tobacco stripping machines are of two types, those which thrash the tobacco to separate the lamina from the stem in fragments of relatively small size, and those which endeavor to remove the lamina in substantially a single piece.

While substantially all of the lamina may be removed from the stem in the thrashing operation, a large proportion of the lamina is suitable only for certain purposes, since it is in a very fragmentary and torn condition.

In the latter process, quite a large proportion of the leaf is usually left on the stem, and the portion removed is in a condition more or less torn and tattered, and hence not entirely suitable for certain purposes, wherein a large section of unbroken leaf is desired.

The stripping of the leaf is usually accomplished by means of toothed rollers or toothed endless belts, between which the leaf is passed, and by which it is more or less mutilated.

The leaves are usually transported through the machine by mechanism arranged to grasp a succession of stem butts with a substantially uniform pressure, irrespective of the varying size of the stems, which results in a large proportion of "drops," that is of leaves so insecurely grasped that they fall from the transporting means of their own weight or are plucked therefrom by the stripping devices, and are hence not acted upon by the same.

An object of the present invention is to provide a machine by means of which substantially all of the lamina may be quickly and easily stripped from the stem portion in a condition substantially entire.

Another object is the provision in such a machine of mechanism for recovering the fragments of the leaf which cling to the butts, and which are usually removed in a prior butting operation, from the stripped portions of the stems.

Another object is the provision of a new and improved type of transporting means for gripping the stem butts, so constructed and arranged that a secure grip may be maintained upon a succession of butts, regardless of variations in size, and regardless of bunching.

Another object is the provision of a stripping mechanism constructed and arranged to remove the largest possible amount of leaf lamina from the stem with a minimum of injury thereto.

Another object is to provide mechanism controlled by the movement of the leaf through the stripping devices for cutting the stem, to retain with the stripped lamina, the finer stem portions suitable for use with the lamina.

To the accomplishment of the foregoing and such other objects as may hereinafter appear, the invention consists in the construction and novel combination of parts fully described hereinafter, illustrated in the accompanying drawings, and pointed out in the claims appended hereto, it being understood that various changes in the form, proportion, size and minor details of construction within the scope of the claims, may be resorted to without departing from the spirit of the invention.

In the present embodiment of the invention, a suitable supporting frame 1 is provided for supporting the parts, and a feed table 2 is arranged at the receiving end of the frame. Near one side of the table a butting plate 3 is mounted, the said plate being supported by brackets 4, which are adjustable laterally, to change the position of the plate. A pair of endless feed belts 5 is mounted at the butting plate, the upper runs of the belts being flush with the table surface, and the butting plate 3 is arranged at the edge of the upper run of the adjacent belt.

The belts are supported by rollers 6 which are journaled on shafts 7 held in bearings below the table, the table having openings 8 through which the roller peripheries extend, so that the upper runs of the belts may run upon the table top. One of the shafts 7 is connected by means of gears 9 with a shaft 10 also journaled below the table, parallel with the shafts 7 and between them.

Figure 1:
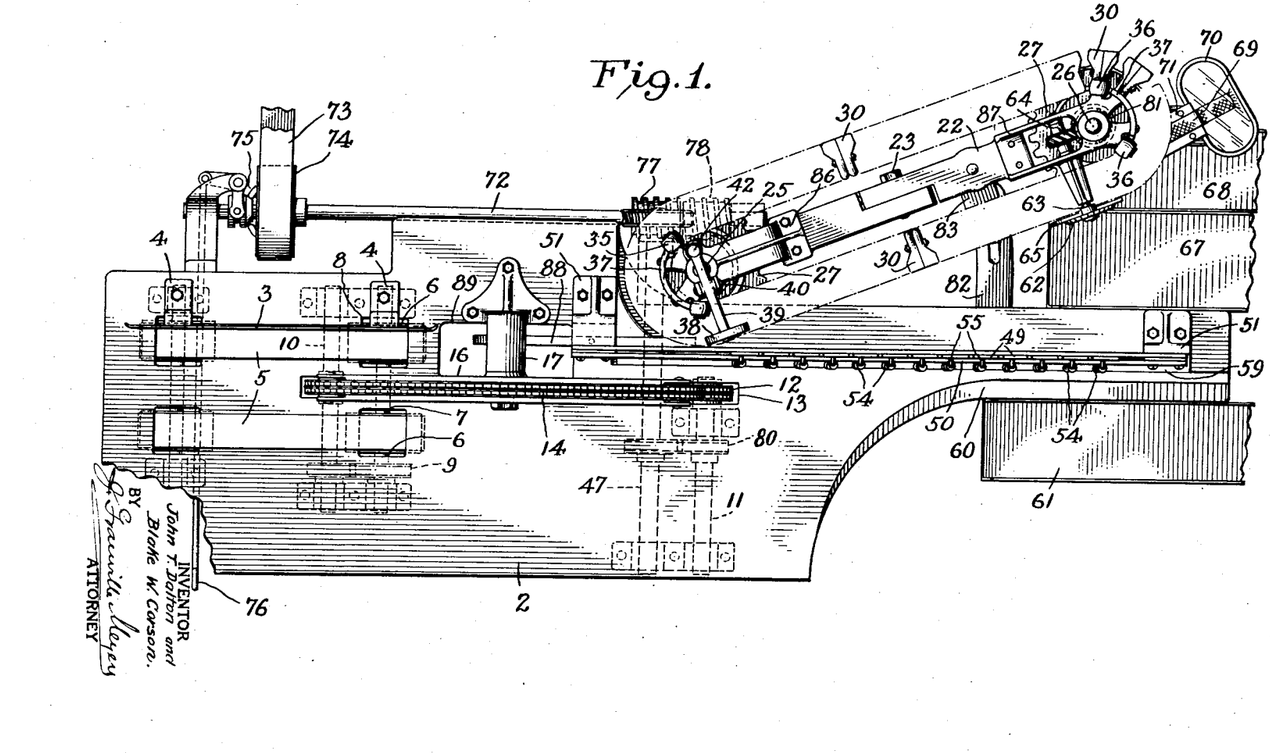
Fig. 1 is a top plan view of the improved machine.

The shaft 10 and another shaft 11, also journaled beneath the table, support a sprocket chain 12, the shafts having registering sprocket wheels on which the chain is mounted, and the upper run of the chain moves over the table top, the table having openings 13 through which the wheels and chain extend. One end of the chain 12 is between the belts 5, as will be clearly evident from an inspection of Fig. 1, so that leaves supported by the belts 5 and properly butted against the plate 3 will be delivered onto the chain 12, before the leaves pass from the belts 5.

The leaves are pressed against the upper run of the belt 12, by the lower run of an endless belt 14, mounted directly above the belt 12, and supported by sprocket wheels 15 journaled in the ends of a plate 16, which is supported by a bracket post 17 on the table. This post has a journal pin as shown, which engages a vertically arranged slot 18 in the plate, so that vertical adjustment of the belt 14 is enabled. The lower run of the belt 14 is held in close contact with the upper run of the belt 12 by means of rollers 19 in elbow levers 20 pivoted to the plate 16. Each of these elbow levers is normally moved by a spring 21 to cause the roller 19 to press the chain 14 toward the chain 12, thereby to insure a good grip on the moving leaves.

The chains 12 and 14 deliver to a moving mechanism for the leaves, which transports the leaves past and through stripping devices, and in a direction diverging gradually from the line of movement of the stripping device. The moving mechanism is supported by an auxiliary frame 22, composed of similar sections, adjustably connected by means of a bolt and nut 23, and set screws 24. When the nut of the bolt 23 is loosened, the sections may be moved toward and from each other, to shorten or lengthen the auxiliary frame, and the parts are locked in adjusted position, by the set screws 24.

Shafts 25 and 26 are journaled vertically at the ends of the frame, and each of these shafts has a sprocket wheel 27 at its upper end, the wheel supporting an endless chain 28. The grippers which are supported by this chain, include each a lower plate like member 29 secured to the chain, and a plurality of upper members 30 for each lower member, pivoted between upstanding lugs 31, on the lower member.

Figures 5, 6, 7, 8, 9:
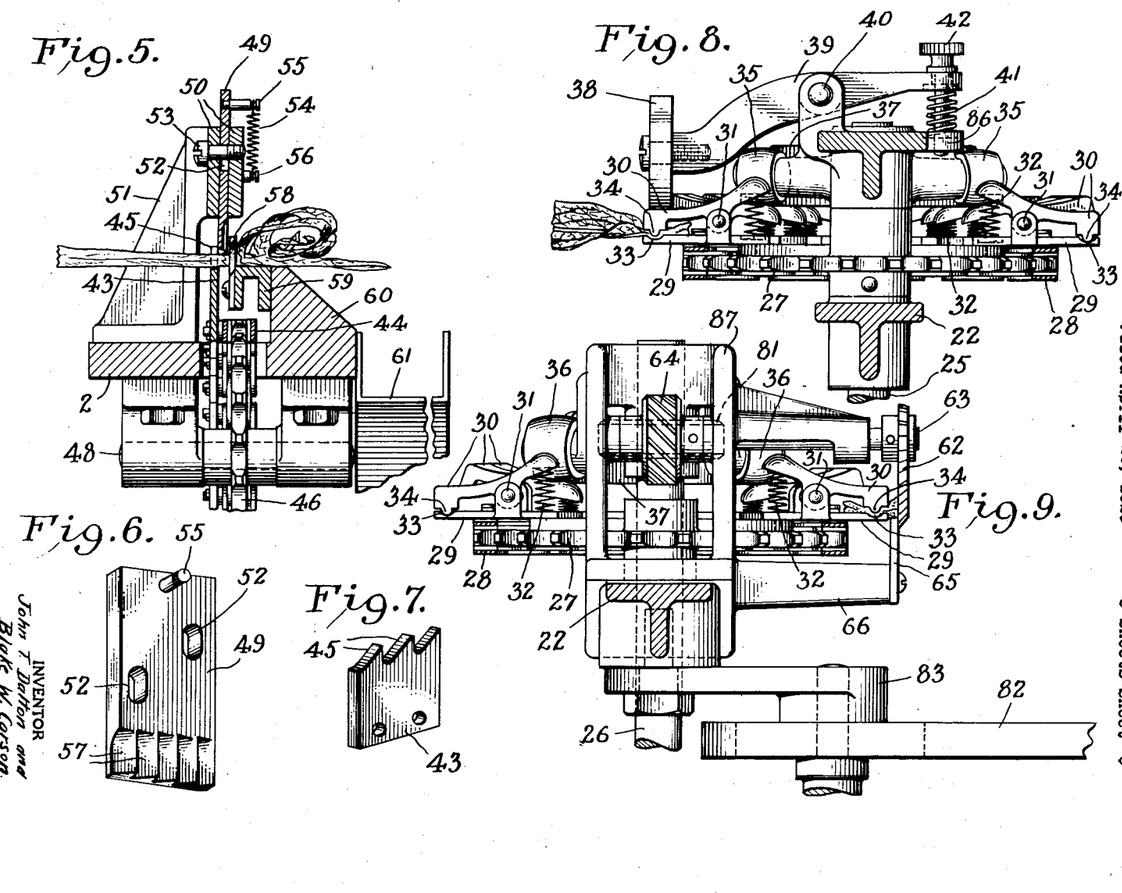
Figs. 5, 8 and 9, are sections on the lines 5—5, 8—8, 9—9, respectively, of Fig. 2.
Fig. 6 is a perspective view of one of the stripping plates.
Fig. 7 is a similar view of another.

These grippers are so spaced that on the tangents of the chain the upper members abut at their adjacent side edges, and the said upper members are pressed toward the lower members by springs 32 arranged between the members. Referring to Figs. 8 and 9, it will be noticed that each of the lower members is grooved transversely as shown at 33, and each upper member has a transverse rib 34 shaped to fit the groove. The upper members are pivoted intermediate their ends, and that end remote from the rib 34 is normally elevated for a purpose to be presently described.

The shaft 25 is at the receiving end of the mechanism, and the shaft 26 at the discharging end, and at each of these stations, namely the receiving and discharging stations, means is provided for opening the grippers. The said means include pairs of rollers 35 and 36, the former at the receiving station and the latter at the discharging station. The rollers are supported by the auxiliary frame, and they are so mounted that when the respective upper or movable gripping members pass beneath them the said members will be moved to open position. The rollers are arranged in pairs as shown, a pair at each station, and the rollers are at the ends of arc shaped tracks 37, which hold the gripping members open as they move between the members of the respective pairs.

At the receiving station, mechanism is provided for positively clamping the grippers on the stem butts, operating independently of the operation of the springs 32. The said means is a roller 38, journaled on one end of the lever 39 pivoted at 40 to the auxiliary frame, the lever being so placed that the outer ends of the movable grippers or gripping members will pass beneath the roller, as the grippers move out from beneath the ultimate roller 35 of the pair. The roller 38 is spring pressed downward, by means of a spring 41, arranged between the auxiliary frame and the end of the lever remote from the roller. The lowermost position of the roller is determined by a set screw 42 which is threaded through the said end of the lever and into engagement with the auxiliary frame. The spring is sufficiently strong to insure that the grippers will grasp the stem butts tightly.

The stripping devices comprise a series of relatively fixed members, and a series of relatively movable members, cooperating therewith along a selected line, from which the grippers diverge gradually as they travel from the receiving to the discharging station. The relatively fixed members are supported in a line, which parallels, and is closely adjacent to the line of travel of the movable members.

The movable members, Fig. 7, are plates 43, which are supported by an endless chain 44, said plates being riveted or otherwise secured to the chain. Each plate has that edge remote from the chain serrated to provide a plurality of teeth 45, and the chain is supported by sprocket wheels 46 on shafts 47 and 48 journaled in the frame. The shaft 47 is driven from the shaft 11 by means of a sprocket wheel and chain connection indicated generally at 48.

The relatively fixed members, Fig. 6 are also plates 49, supported between a pair of bars 50, which are in turn supported by bracket arms 51 on the main frame. Each of these plates is arranged between the bars of the pair, and has a lost motion connection therewith, to permit a degree of vertical movement of the plate. Each plate has a pair of vertical slots 52, through which pass screws 53 connecting the bars, and the vertical movement of the plate is determined by the length of the slots. The plates are normally spring pressed downward, as shown in Fig. 5, by means of springs 54, arranged between stop pins 55 and 56 on plates 49 and the front bar 50, respectively.

Figure 3:
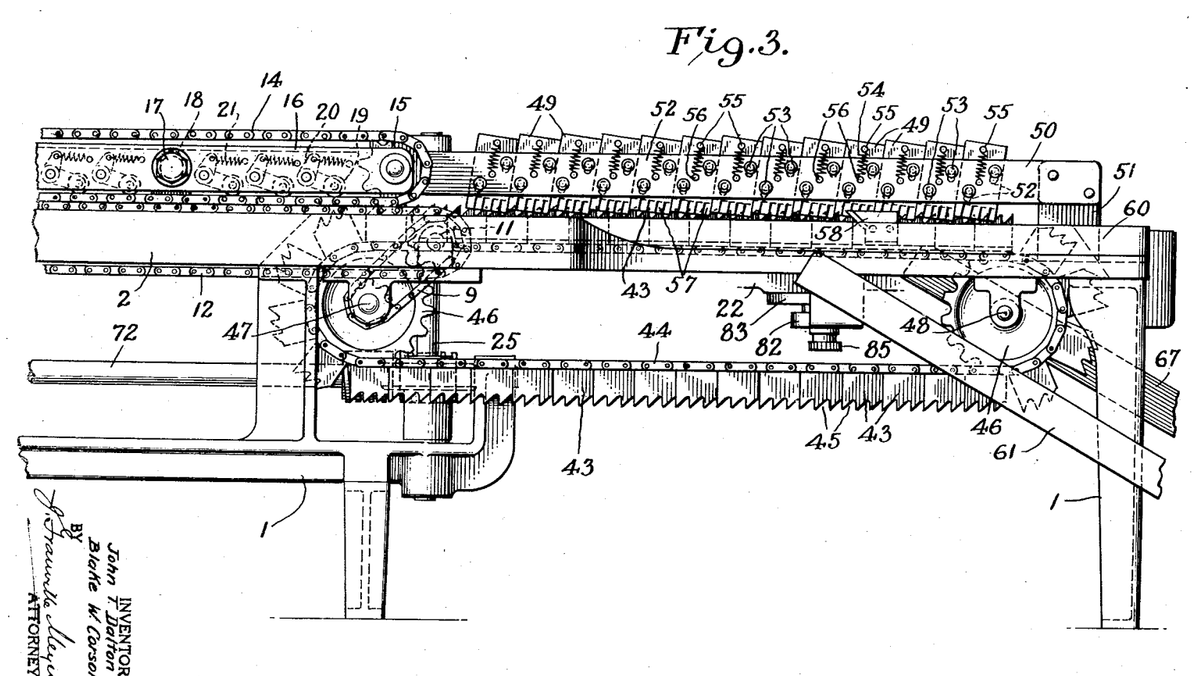
Fig. 3 is a partial side elevation showing the stripping mechanism, and a part of the feed mechanism.

Referring to Fig. 5 it will be seen that the bars 50 are so arranged with respect to the chain 44 that the lower ends of the plates 49 slide along the forward faces of the plates 43 carried by the chain, and each of the plates is slightly inclined rearwardly at its upper end, as shown in Fig. 3. The arrangement is such, that the forward lower corner of each plate 49 is at a height such that the notches between the teeth of the plates 43 are well exposed, while at the rear corners of the plates 49 the notches are almost hidden.

Figure 2:
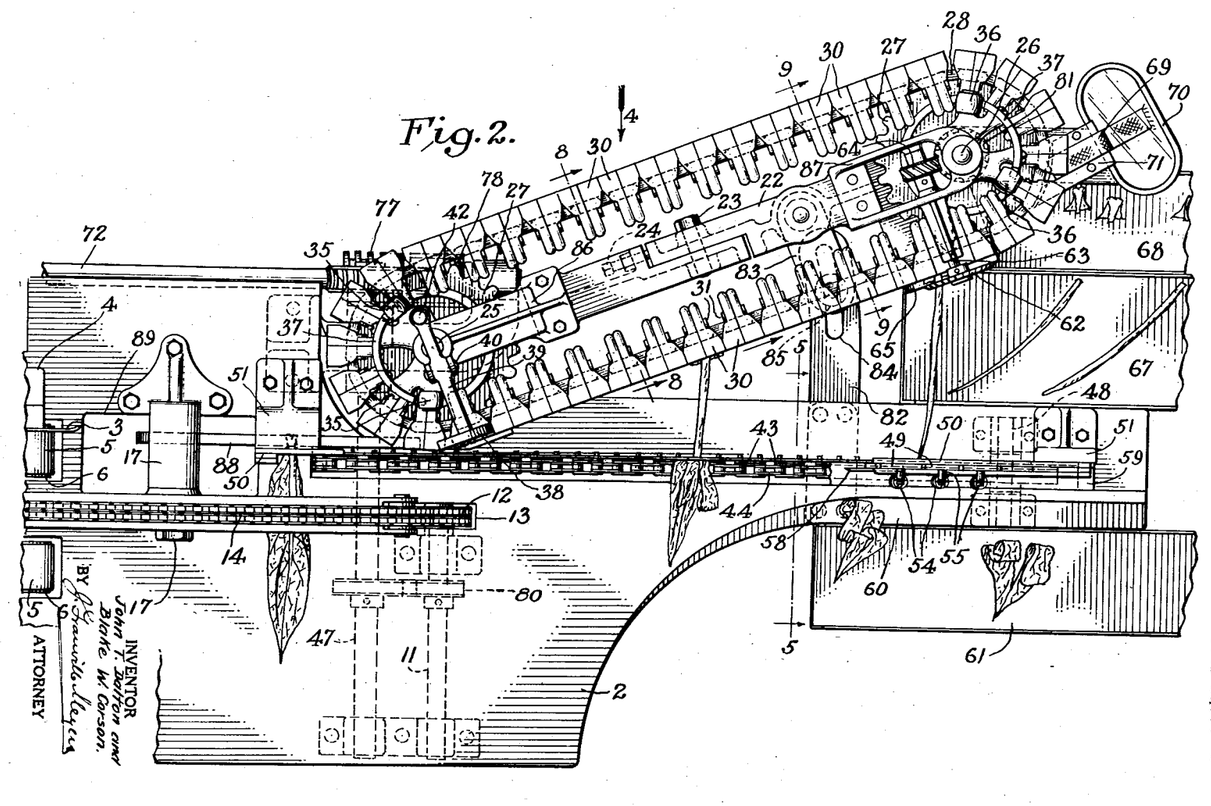
Fig. 2 is an enlarged detail in plan of the leaf moving mechanism, and the stripping devices.

As the tobacco leaves are firmly gripped by the grippers, they will be delivered by the lower chain 12 to the teeth of the plates 43. it being understood that the upper run of the chain 44 travels in the same direction as the upper run of the chain 12. The teeth of the plates 43 will assist in carrying the leaves through the stripping devices, of which the teeth form a part. As the leaves move laterally with respect to their length through the stripping devices, they will be moved longitudinally, because of the divergement of the grippers from the line of operation of the stripping devices, and the lamina will be gradually and cleanly stripped from the thicker portion of the stem, as shown in Fig. 2. The stems will lie in the notches between the teeth, and will be yieldingly held in the notches by the plates 49, which however yield to compensate for inequalities in the size of stems.

Referring to Fig. 6 it will be noted that each plate 49 is serrated as indicated at 57 at its lower edge, and on that face remote from the teeth of the plates 43. These teeth 57 assist in the stripping operation, and it will be noticed from Fig. 7, that the teeth 45 are right triangular, and so arranged that they present a vertical face rearwardly.

The finer portions of the stem, that is the portion adjacent to the tip, is capable of utilization for all purposes in which the leaf was used, and it is not desirable that this portion be left with the stem to be discarded. Hence at a selected point in the travel of the leaves, means is arranged to cut the stem, which operation separates the stripped portion of the leaf, and the utilizable portion of the stem, from the waste portion.

The said means is constituted by a blade 58 which is secured to an inverted channel bar 59 arranged in front of the plates 43 and the plate 49, and upon which the unstripped portion of the leaf moves. The said blade, Fig. 3 has its cutting edge forward, and the said edge is undercut or inclined, so that the tips of the leaves are restrained from upward movement when they meet the cutting edge, and are cleanly severed by said edge. The channel bar 59 is supported above the upper run of the chain, by means of an extension 60 of the table 2. The severed portion of the leaf, namely the stripped lamina and the tip of the stem slide down the beveled face of the extension 60 of the table, into a chute 61, by means of which they are delivered to a suitable receptacle.

Where the butts are not stripped prior to the engagement of the leaves with the stripping devices there is some lamina remaining on the stripped stem at the butt, and within the gripper, that is on the portion gripped by the grippers, and which is not reached by the stripping devices. Referring to Fig. 2 it will be seen that at the moment when the leaves pass into engagement with the stripping devices, the grippers move very close to the plates 43, almost in contact therewith, so that the leaf is stripped close to the grippers.

The portions of lamina which remain on the gripped butt are of value, and it is desirable that they be recovered, either by prior stripping, or in the manner to be described. After the severance of the tip from the stem, the stem is carried into engagement with a cutting device, which severs the waste stem from the butt still carrying leaf lamina. The said device, Fig. 9, includes a rotatable cutter 62, secured to a shaft 63, journaled in the auxiliary frame, and driven from the shaft 26 through a spur-gear connection indicated generally at 64. The rotary cutter, which has a serrated cutting edge cooperates with a fixed or ledger blade 65, supported by a laterally extending arm 66 from the auxiliary frame 22.

As the stems move into engagement with the cutter, the waste portion thereof is severed from the butt, and falls into a chute 67, which delivers these portions to a suitable receptacle. Just beyond the rotary cutter, the grippers come into engagement with the opening mechanism at the discharge station, and the grippers are opened to release the butts, which fall into a chute 68, which delievers them into a suitable receptacle. The lamina on these portions may be recovered in any suitable manner, as for instance by thrashing.

The efficient action of the grippers is susceptible to impairment by accretions of juice, leaf and stem particles and the like, and it is desirable that they be freed from these accretions before they again reach the receiving station. For this purpose a wick 69 is so supported, that one end thereof passes between the upper and lower members of the grippers, while they are open. The other end of the wick dips into a receptacle 70 containing water, or other suitable detersive. The receptacle 70 is supported by a plate 71 connected with the auxiliary frame and the wick rests upon the plate and is held thereby from movement with the grippers.

The machine is driven from a suitable source of power, which is connected to a drive shaft 72 journaled longitudinally of the frame at the rear thereof, by means of a belt 73, which engages a normally loose pulley 74 on the drive shaft. The pulley may be connected to the shaft by means of clutch mechanism 75 which is operated by a rod 76, extending to the front of the frame, in convenient position for engagement by the operator of the machine at the receiving end thereof.

The shaft 72 has two worms 77 and 78. The worm 77 drives the shaft 47 journaled transversely of the frame, near to the shaft 11 and parallel therewith. The shaft 47 is connected to the shaft 11, in any suitable manner, as for instance by the chain and sprocket connection indicated generally at 80. Through this connection, the feed chains 12 and 14 are driven as well as the feed belts 5, and the chain 44.

The worm 78 drives the shaft 25. This worm meshes with a worm wheel not shown near the lower end of the shaft 25, and through the said wheel drives the leaf transporting mechanism, and through said mechanism the rotary cutter 62.

Figure 4:
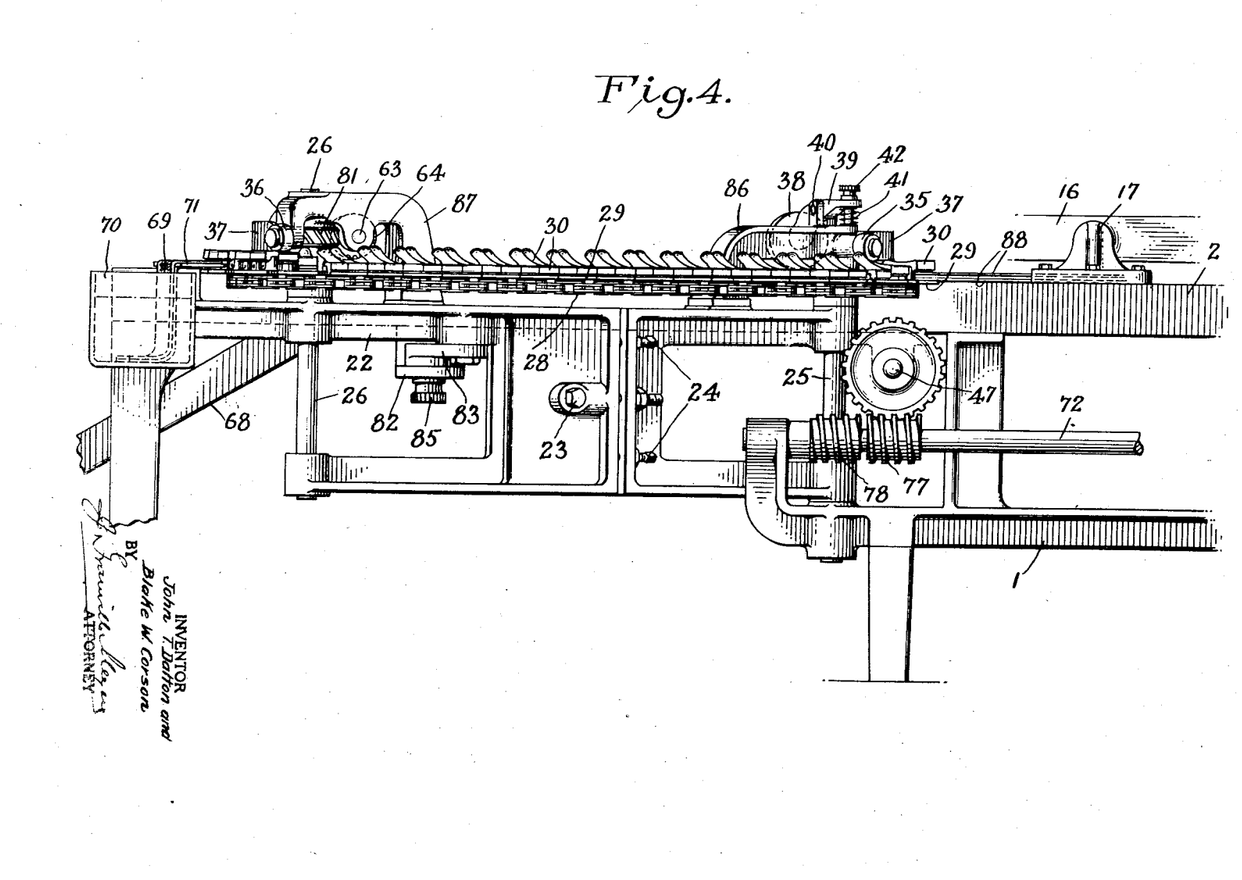
Fig. 4 is a view of Fig. 3 looking from the opposite direction.

The auxiliary frame is mounted in such manner that the angle of its divergence from the line of operation of the stemming devices may be varied. The frame swings on the forward shaft 25, as shown more particularly in Figs. 2 and 4, the rear end of the frame, that is the end which carries the shaft 26 being movable toward and from the main frame. An arm 82 extends laterally from the main frame, and the auxiliary frame has connected therewith a link 83 which slides upon the arm. The link has an opening, and the arm an arc shaped slot 84 whose center is the shaft 25, and a set screw 85 passes through the slot and engages the opening of the link to hold the parts in adjusted position. The link 83 is rigid with the auxiliary frame, and when the set screw is loosened, the link may be moved on the arm, the set screw moving in the slot.

The elements 35—37 at the forward end of the auxiliary frame are carried by a bracket arm 86 extending upwardly from the frame and longitudinally thereof, above the shaft 25, the upper end of the shaft being journaled in the bracket arm. The elements 36—37—72—78 at the rear end of the auxiliary frame are carried by a similar arm 87. The adjustment of the auxiliary frame does not interfere with the connection between the worm 78 and its associated worm wheel, since the adjustment is about the axis of the worm wheel.

The operation of the stripping machine is as follows. Tobacco is fed from the hand onto the feed table and onto the belts 5. The leaves are butted against the plate 3, and in proper relation with respect to this plate are passed into the grasp of the chains 12—14. Just before the leaves pass out from between these chains, the butts are guided into position between the jaws of the grippers, that is between the fixed and the movable members, by a guide rail 88 supported in an opening 89 in the feed table. This rail guides the butts into position between the movable and fixed members of the gripper, just before the movable members pass from beneath the roller 35 which releases them and permits them to close upon the stem butts.

Immediately after the movable members of the grippers pass from beneath the roller 35, they are engaged by the wheel or roller 38, and positively clamped onto the butts, as shown in Fig. 8. The leaves are now engaged by the stripping devices, which work the lamina loose from the stem, and gradually strip it toward the tip, as the stems are moved longitudinally by the divergement of the grippers from the line of operation of the stripping devices. When the stripping action has reached the point where the stem is so small that it may be utilized with the lamina, the leaves engage the blade 58, which cuts the terminal portion of the stem, discharging the stripped lamina with the stem tip into the chute 61.

Further travel of the stems brings them into engagement with the rotary cutter 62, which severs the stem at the point where the strippers commenced their action, and that portion of the stem devoid of lamina, and which is waste, is dropped into the chute 67. The butts are carried by the grippers until the movable members pass beneath the first roller 36, at which time the grippers are released. The butts are positively disengaged by the plate 37, falling into the chute 68, and the grippers are cleaned from juice, dust, and like accretions by the wick 69. When the butts are cleaned prior to the operation of the stripping devices, the rotary cutter 62 may be dispensed with if desired, since it will not be necessary to save the butts for further operation.

We claim:

1. A tobacco stripping machine including cooperating sets of stripping devices having guided relative movement along a selected line, and moving mechanism for moving a succession of leaves past the stripping devices, said mechanism having guided movement in a direction diverging from the line of movement of the stripping devices, thereby to draw the stems longitudinally through the stripping devices, while the leaves are moving laterally, and a fixed blade arranged substantially parallel with the direction of movement of the stripping devices and having a cutting edge inclining downwardly in the direction of travel of the stems and so positioned that the stems will engage between the said edge and the stripping devices.

2. A tobacco stripping machine, including cooperating sets of stripping devices having guided relative movement along a selected line, and moving mechanism for moving a succession of leaves past the stripping devices, said mechanism having guided movement in a direction diverging from the line of movement of the stripping devices, thereby to draw the stems longitudinally through the stripping devices, while the leaves are moving laterally, the moving mechanism including a plurality of normally operative grippers for grasping the stem butts moving along an endless path, means for opening the grippers at selected intervals to receive and release the butts, and means at the receiving station of the grippers to supplement the normal operation of the grippers to constrain them to close engagement with the butts.

3. A tobacco stripping machine, including cooperating sets of stripping devices having guided relative movement along a selected line, and moving mechanism for moving a succession of leaves past the stripping devices, said mechanism having guided movement in a direction diverging from the line of movement of the stripping devices, thereby to draw the stems longitudinally through the stripping devices, while the leaves are moving laterally, the moving mechanism including a plurality of normally operative grippers for grasping the stem butts moving along an endless path, means for opening the grippers at selected intervals to receive and release the butts, the grippers spring controlled, and means at the receiving station of the grippers for positively clamping them on the stems.

4. In a tobacco stripping machine, including moving mechanism comprising a plurality of flexibly connected grippers each composed of members normally spring operated to closed position for grasping the stems, means for opening the members at selected intervals to receive and release the butts, and a wiper adjacent the discharge station of the grippers and positioned to move between the open members and to wipe the adjacent faces thereof as the members are moved past the wiper.

5. A tobacco stripping machine including cooperating sets of stripping devices having guided relative movement along a selected line, and moving mechanism for moving a succession of leaves past the stripping devices, said mechanism having guided movement in a direction diverging from the line of movement of the stripping devices, thereby to draw the stems longitudinally through the stripping devices, while the leaves are moving laterally, the stripping devices including a plurality of sets of toothed members, the members of one set resiliently pressed toward the members of the other, the members of each set movable with respect to each other.

6. A tobacco stripping machine including cooperating sets of stripping devices having guided relative movement along a selected line, and moving mechanism for moving a succession of leaves past the stripping devices, said mechanism having guided movement in a direction diverging from the line of movement of the stripping devices, thereby to draw the stems longitudinally through the stripping devices, while the leaves are moving laterally, the stripping devices including a moving succession of teeth, and a relatively fixed series of plates with which the teeth cooperate to engage the leaves between them, the plates being resiliently pressed toward the teeth.

7. A tobacco stripping machine including cooperating sets of stripping devices having guided relative movement along a selected line, and moving mechanism for moving a succession of leaves past the stripping devices, said mechanism having guided movement in a direction diverging from the line of movement of the stripping devices, thereby to draw the stems longitudinally through the stripping devices, while the leaves are moving laterally, the stripping devices including a moving succession of teeth, and a relatively fixed series of plates cooperating with the moving teeth and engaging the leaves between the plates and the moving teeth, the plates being resiliently pressed toward the teeth and being serrated on the face adjacent to the teeth.

8. In a tobacco stripping machine, leaf transporting mechanism including an endless chain of grippers normally spring biased to closed position, means for supporting and moving the chain, means operated by the movement of the chain for opening the grippers at a plurality of stations to receive and discharge leaves, and means at the receiving station to positively clamp the grippers on the stems.

9. In a tobacco stripping machine, leaf transporting mechanism including an endless chain of grippers each comprising members normally spring biased to closed position, means for supporting and moving the chain, means operated by the movement of the chain for opening the grippers at a plurality of stations to receive and discharge leaves, means at the receiving station to positively clamp the grippers on the leaves and a wiper positioned to engage the adjacent faces of the members of the grippers when they are opened at the discharge station.

10. In a tobacco stripping machine, leaf transporting mechanism including an endless chain of grippers normally spring biased to closed position, means to press the butts of a succession of leaves to the grippers in position for the grippers to grasp said butts, means for supporting and moving the chain, means operated by the movement of the chain for opening the grippers at a plurality of stations to receive and discharge leaves, means at the receiving station to positively clamp the grippers on the leaves, and means controlled to operate by the movement of the grippers to separate the grasped butt from the waste stem.

11. In a tobacco stripping machine, leaf transporting mechanism including an endless chain of grippers normally spring biased to closed position, means for supporting and moving the chain, means operated by the movement of the chain for opening the grippers at a plurality of stations to receive and discharge leaves, means at the receiving station to positively clamp the grippers on the leaves, and stripping devices operating along a selected line diverging from the line of travel of the grippers when transporting the leaves.

12. In a tobacco stripping machine, leaf transporting mechanism including an endless chain of grippers normally spring biased to closed position, means for supporting and moving the chain, means operated by the movement of the chain for opening the grippers at a plurality of stations to receive and discharge leaves, means at the receiving station to positively clamp the grippers on the leaves, stripping devices operating along a selected line diverging from the line of travel of the grippers when transporting the leaves, and means in connection with the chain supporting and guiding means to vary the angle of divergence between the transporting means and the stripping devices.

13. In a tobacco stripping machine, leaf transporting mechanism including an endless chain of grippers normally spring biased to closed position, means for supporting and moving the chain, means operated by the movement of the chain for opening the grippers at a plurality of stations to receive and discharge leaves, means at the receiving station to positively clamp the grippers on the leaves, and stripping devices operating along a selected line diverging from the line of travel of the grippers when transporting the leaves, the stripping devices including moving members moving in a direction to advance the leaves.

14. In a tobacco stripping machine, leaf transporting mechanism including an endless chain of grippers normally spring biased to closed position, means for supporting and moving the chain, means operated by the movement of the chain for opening the grippers at a plurality of stations to receive and discharge leaves, means at the receiving station to positively clamp the grippers on the leaves, stripping devices operating along a selected line diverging from the line of travel of the grippers when transporting the leaves, and means operated by the travel of the leaves in the grasp of the grippers to cut the stem in the line of the stripping devices when the grippers in which the stem is grasped are at a selected distance laterally from said devices.

15. A tobacco stripping machine including cooperating sets of stripping devices having guided relative movement along a selected line, and moving mechanism for moving a succession of leaves past the stripping devices, said mechanism having guided movement in a direction diverging from the line of movement of the stripping devices, thereby to draw the stems longitudinally through the stripping devices, while the leaves are moving laterally, the stripping devices including sets of teeth engaging the stems between them, each set flexible and mounted to yield away from the other throughout the length thereof and one set resiliently pressed toward the other.

16. In a tobacco stemming machine, stemming devices including a succession of teeth moving in one direction, and a plurality of plates lapping the teeth at one side thereof, and mounted to yield away from the teeth in the plane of the teeth.

17. In a tobacco stemming machine, stemming devices including an endless succession of teeth moving in one direction, and a plurality of plates lapping the teeth at one side thereof, and mounted to yield away from the teeth in the plane of the teeth.

18. In a tobacco stemming machine, a stemming device including a succession of teeth moving in one direction, and a plurality of plates lapping the teeth at one side thereof, and mounted to yield away from the teeth in the plane of the teeth, the plates serrated on the face remote from the teeth.

19. In a tobacco stemming machine, stemming devices including an endless succession of teeth moving in one direction, and a plurality of plates lapping the teeth at one face thereof, and mounted to yield in the plane of the teeth at an angle with respect to the direction of travel thereof.

20. In a tobacco stemming machine, stemming devices including an endless succession of teeth moving in one direction, and a plurality of plates lapping the teeth at one face thereof, and mounted to yield in the plane of the teeth at an angle with respect to the direction of travel thereof, the lapping ends of the plates being serrated.

21. In a tobacco stemming machine, stemming devices including an endless chain of toothed plates, and a plurality of cooperating plates lapping the teeth at one face of the chain of plates and spring biased toward the teeth.

22. In a tobacco stemming machine, stemming devices including an endless chain of toothed plates, and a plurality of cooperating plates lapping the teeth at one face of the chain of plates and means for moving the chain in one direction, the last named plates having a limited yielding movement away from the chain in the direction of travel of the chain.

23. In a tobacco stemming machine, transporting means for a succession of leaves, and adapted to grip the butts thereof, and means for feeding a succession of leaves to the transporting mechanism, with their butts in position to be grasped thereby, said means including a butting plate, a pair of endless belts spaced apart from each other to support the opposite ends of the leaves to move them past the butting plate, and a carrier arranged between the belts and to which the belts deliver to engage the leaves intermediate their ends, and carry them to the transporting mechanism.

JOHN T. DALTON.
BLAKE W. CORSON.